Patented Oct. 9, 1934

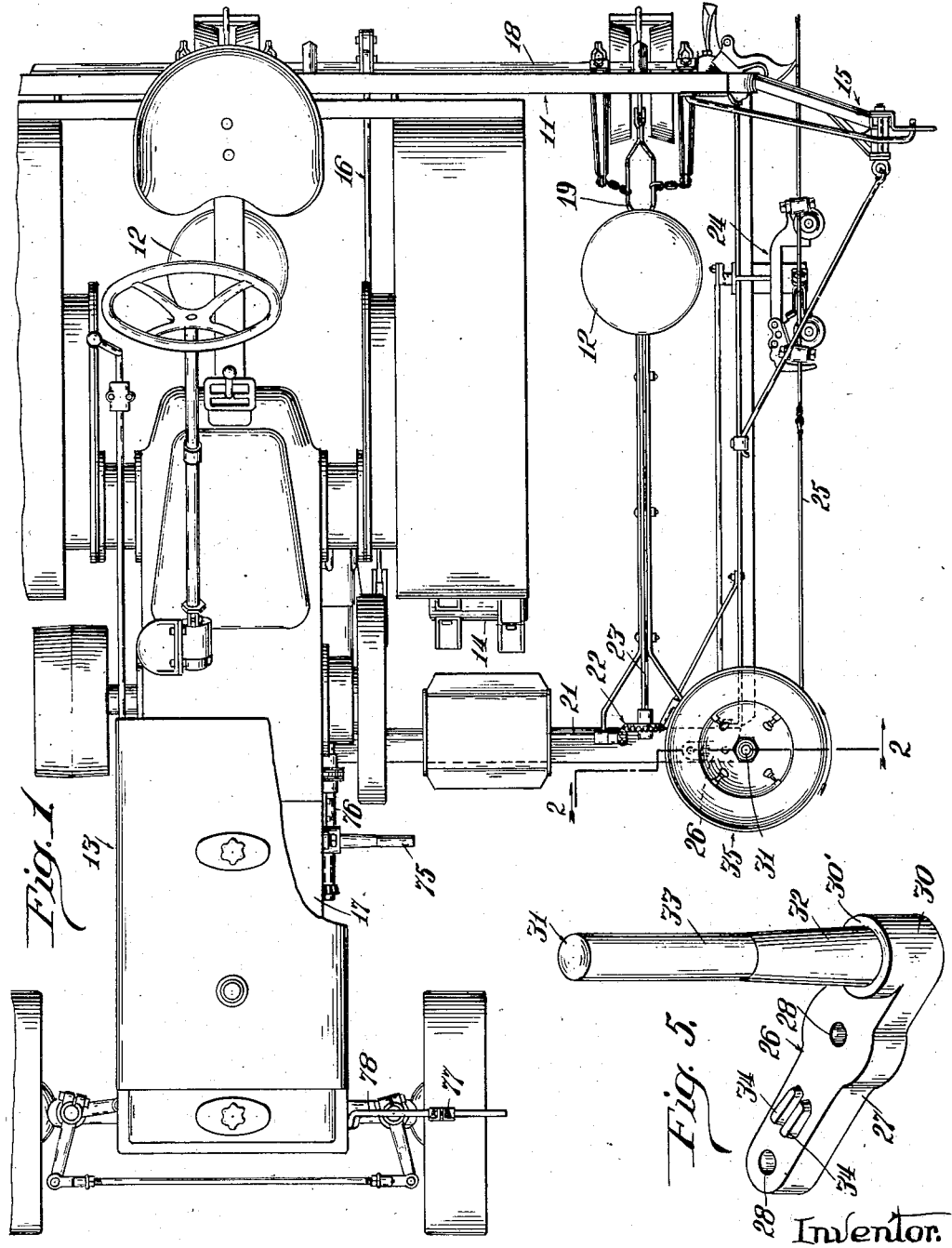

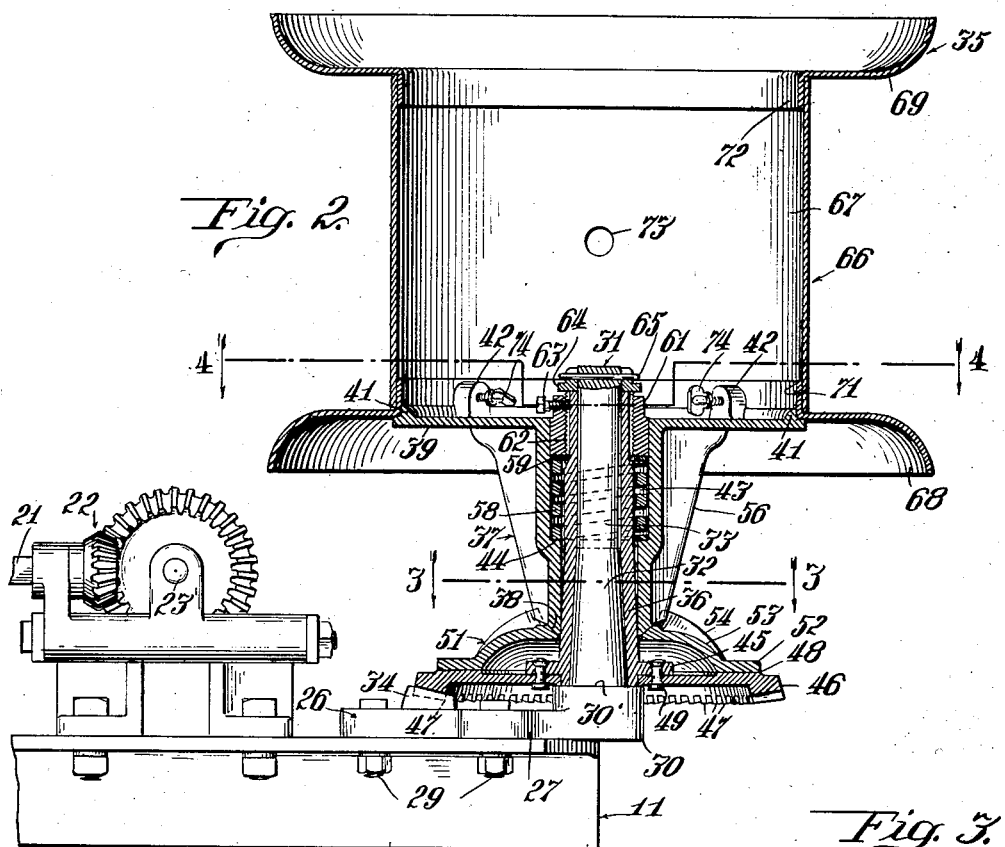
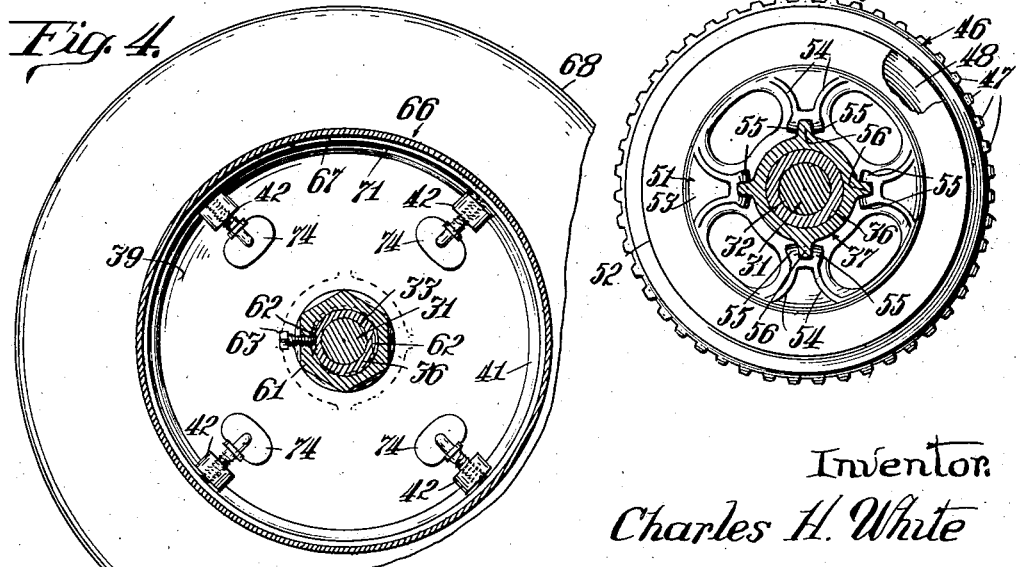

1,976,315

UNITED STATES PATENT OFFICE 1,976,315

PLANTER MECHANISM

Charles H. White, Moline, Ill., assignor to Deere & Company, Moline, Ill., a corporation of Illinois Original application December 19, 1929, Serial No. 415,221. Divided and this application March 11, 1931, Serial No. 521,631

17 Claims. (Cl. 111—44)

This invention relates to planters of the checked-row planter type and more particularly to check-wire reeling mechanism therefor particularly adapted for a tractor planter of the type disclosed in my copending application for Tractor planter, Serial No. 220,472, filed September 19, 1927, the instant application being a division of my copending application for Planter mechanism, Serial No. 415,221, filed December 19, 1929.

As pointed out in my last named copending application, it has heretofore been the custom in check-row planting to first lay out the wire, stake the end thereof, and to then proceed with the planting operation. Consequently, a complete trip across the entire length of the field must first be made solely for the purpose of laying the wire before the actual planting operation can be begun. It is clear then that where large fields are planted, particularly where the planting operation takes place longitudinally of the fields, considerable time is lost in the operation of initially laying out the check-wire.

In the copending application Serial No. 415,221 hereinbefore referred to, I have disclosed a novel method and means of reeling the check-wire upon completion of the planting operation. The present application is primarily directed to an improved arrangement for unreeling the check-wire.

Accordingly, the main object of the present invention resides in the provision of a novel reel mechanism and the manner of mounting such a reel mechanism upon a planter whereby check-wire may be laid out on the first trip of the planter across the field and the first set of rows concurrently planted. Since tractor planters are now more and more coming into extensive use, it is desirable to provide such a reel mechanism and the association of the reel mechanism with the planter so arranged that the unreeling operation may be quickly and readily accomplished simultaneously resulting in quick, accurate and ready laying out of the check-wire for concurrent coaction with the usual check-row head controlling the planting operation resulting in accurate planting of the rows. Preferably, the arrangement is such that the check-wire will be payed out through the check-row head that the wire will be drawn in a direction parallel with the course traversed by the tractor planter and in alignment with the check-row head.

Another object resides in the provision of a novel arrangement wherein the check-wire may be unreeled and laid out from either side of the planter depending on which side of the field is first planted. As the exigencies of each field may require, it may be desirable to unreel from either side of the tractor planter. To this end, I have provided a novel arrangement wherein the reel mechanism may be disposed to either side of the planter for effectively permitting the wire to cooperate with check-row heads disposed at either side of the planter.

A further object of the present invention resides in the provision of a novel reel mechanism for association with a reversible reel which includes tension means providing for effective tensioning of the check-wire in the laying out operation to provide for proper and accurate operation of the planting units irrespective of any inequalities in the ground surface.

Another object is the provision of a novel reel mechanism wherein parts are adapted to be so controlled that a substantially constant tension may be maintained on the check-wire in the unreeling operation. To this end, the reel mechanism includes a novel slippage arrangement which prevents over-running or free floating of the reel in the event that the check-wire should be jerked in the laying out operation as the check-row buttons of the check-wire are passing through the check-head, thus avoiding free spinning of the reel and a consequent release of a length of check-wire which might become entangled or caught. In addition, the arrangement is such that by the retarding action, the tension upon the check-wire is such as to simulate the normal tension of check-wire in staked condition thereby providing for the same accuracy in unreeling and concurrent planting as in subsequent normal planting of succeeding rows.

A further object resides in the provision of a novel reel mechanism support adapted for association with the planter and including novel cooperating parts which by cooperation with the reel mechanism provides for the maintenance of constant tension on the check-wire in unreeling.

Other and further objects of the present invention will appear from the following detailed description of a preferred embodiment of the invention illustrated in the accompanying drawings in which:

Figure 1 is a fragmentary plan view of a tractor planter showing the planter in assembled position upon the tractor with the reel mechanism mounted on the frame in unreeling position;

Figure 2 is an enlarged sectional view through the reel mechanism as shown in position on the planter frame, such view being taken substantially along the line 2—2 of Figure 1;

Figure 3 is a section taken substantially along the line 3—3 of Figure 2;

Figure 4 is a section taken substantially along the line 4—4 of Figure 2; and

Figure 5 is a perspective view of the reel mechanism support.

In Figure 1, I have illustrated a fragmentary portion of planter of the type disclosed in my copending application Serial No. 220,472 hereinbefore referred to which comprises a frame 11 supporting power operated planter units 12, the planter frame being so mounted on a tractor 13 that the rear wheels 14 of the tractor are disposed within the planter frame with two of the planter units 12 positioned between each tractor wheel and the outer side edge of the frame, with a third unit positioned between the wheels 14. While I have illustrated only a portion of the planter frame, it will be understood that the side of the planter mechanism not shown is similar to the side shown and has only been omitted to simplify the present disclosure.

A marker 15 of the type disclosed in my copending application for markers, Serial No. 408,445, filed November 20, 1929, is mounted for vertical pivotal movement at each rear corner of the planter frame. The marker arms and planter units are each power operated to raised and lowered positions by a suitable power linkage connection 16 from the power plant 17 of the tractor operating through a rock-shaft 18 mounted in suitable bearings disposed in spaced relation along the rear frame portion, each planter unit being connected to the rock-shaft by a link 19 and each marker being operated by the engagement therewith of a suitable cam carried at each end of the rock-shaft. The seeding devices of the planter units are each power operated from the power plant 17 by a suitable shaft 21 journaled in suitable bearings along the front frame portion and operating through bevel gear connections 22 with shafts 23 leading back to the planter units. Each side frame member carries suitably secured thereto in proximity to a line connecting the planter units, a check-head 24 preferably provided with a wire doffing mechanism of the type disclosed in my copending application for Wire doffing mechanism for planter, Serial No. 217,569, filed September 6, 1927. Since the above described features independently, form no part of the present invention, they will only be generally hereinafter referred to.

To provide for concurrent unreeling of checkwire 25 for simultaneous laying out and planting of the first rows, I have provided at each front frame corner, a reel mounting bracket 26. The bracket comprises a base portion 27 having longitudinally spaced apart holes 28 extending transversely therethrough for accommodating for passage therethrough of suitable securing means such for example as bolts 29 to secure the bracket to the front frame member.

One end of the bracket base 27 has projecting upwardly therefrom, a substantially cylindrical boss 30. A spindle 31 comprising an upwardly tapering, frusto-conical portion 32 adjacent the base portion and substantially cylindrical portion 33 extending upwardly from the upper end of the frusto-conical portion, extends upwardly from boss 30. The base of the frusto-conical portion 32 is of lesser diameter than boss 30 providing an annular seat 30'. The purpose of providing the spindle with such portions will more specifically hereinafter appear. The base portion 27 is further provided with a pair of sloping projections 34 simulating beveled gear teeth arranged in arcuate spaced apart relation with the axis of the spindle as a center, such projections being suitably spaced from the spindle. The purpose and function of the projections 34 will be hereinafter described.

Brackets 26 are so positioned on the frame with respect to the check-heads 24 that with the reel mechanism 35 disposed thereon, the check-wire 25 will be unreeled through the adjacent checkhead 24 with the wire unreeling from the outer side of the reel and in a line approximately in alignment with the travel of the wire through the check-head.

Referring now more particularly to Figures 2, 3, and 4, the reel mechanism 35 comprises a tubular bearing 36, the inner periphery of which conforms generally to the outer periphery of the spindle 31 of the supporting bracket 26. A reel hub 37, one end of which is beveled as indicated at 38, is journaled upon the lower end of the bearing 36, the inner bore of the hub being slightly larger in diametric dimension that the outer periphery of the narrowest portion of the frustoconical portion 32 of spindle 31. The other end of the hub 37 is provided with an integral radial disc portion 39 provided with an upwardly projecting substantially circular flange 41 spaced radially inwardly from the periphery of the disc.

A series of circumferentially disposed lugs 42 extend upwardly from the disc 39 with the outer ends of such lugs flush with the outer periphery of the flange 41. Extending downwardly from the disc portion 39 and for a substantial portion of the length of the reel hub 37, the hub is provided with a counterbore 43 providing an inner annular seat 44, the purpose of which will be hereinafter explained. The lower end of bearing 36 is provided with a peripheral flange 45 spaced inwardly from the lower end of the bearing, such flange forming a seat for a bevel gear 46 provided with radially disposed gear teeth 47 on its face and a clutch face 48 on its back side. Gear 46 is secured to the flange 45 by means of circumferentially spaced rivets 49, the central portion of the gear being provided with a recess or bore for seating the gear on the end of the bearing. In the mounted position the reel mechanism 35, the lower end of bearing 36 seats upon the annular seat 30'. Concentrically disposed and loosely mounted on the bearing 36 adjacent the bevel gear 46, is a friction disc 51 provided with a friction flange 52 and a concavo-convex central portion 53 which is disposed in spaced relation to the bearing flange 45. The convex side of the friction disc 51 is provided with outwardly extending, radially directed ribs 54 terminating at their inner ends in seats 55.

Hub 37 is provided with a plurality of radially outwardly directed reinforcing ribs 56, the lower ends of which are seated in the seats 55 of the friction disc with the beveled end 38 of the hub engaging an annular disposed upwardly tapering beveled surface 57 on the friction disc 51. A coil spring 58 is seated in the enlarged or counterbored portion of the hub 37 with its lower end seated on the annular seat 44 and extending upwardly and being concentrically disposed about the bearing member 36. The upper or outer end of spring 58 is disposed in abutting relation with a washer 59 retained in engagement with the spring by a preferably hexagonally crowned nut 61 threadedly associated with the upper end of bearing member 36. The upper end of bearing 36 is provided with a plurality of diametrically opposed, longitudinally extending grooves 62 extending across the threads thereof, such grooves being adapted to selectively receive a set screw 63 threaded radially through the crown of the nut 61. By releasing the set screw 63, and rotating the nut 61, the pressure of spring 58 may be varied as desired, thus providing for variation of pressure exerted by the friction plate 51 against the clutch face 48 of the gear 46 through the hub 37. The reel mechanism is retained in position upon spindle 31 by a castellated collar 64 which is fitted over the free end of the spindle and retained in position by a pin 65 passing diametrically through the spindle.

A reel drum 66 adapted to be associated with the reel hub, comprises a central tubular portion 67 having outwardly flared end flanges 68 and 69 suitably secured thereto at each end, such flanges having annular extensions 71 and 72, respectively, seated in and abutting the inner wall of the tubular portion 67. Thus, the drum 66 provides a spool-like body adapted to readily receive a plurality of convolutions of check-wire thereon. The tubular portion 67 is provided with a suitable perforation 73 for receiving therethrough and retaining one end of the check-wire. Each lug 42 of the flange 39 carries a radially disposed thumb screw 74 suitably threaded therethrough, the heads of such screws being disposed inwardly toward the center of the hub, while the outer biting ends thereof are adapted to engage the inner wall of either flange 71 or 72 of the reel drum to retain the drum on the reel mechanism. Since the reel drum is of symmetric configuration, it will be readily apparent that the drum is readily reversible end for end for mounting upon the flange 39 of the hub 37.

Referring now more particularly to Figures 1 and 2, in the unreeling and concurrent planting operation of the first three rows, the reel mechanism 35 is mounted on the spindle 31 of the bracket 26 with the reel 66 uppermost and the hub portion 37 thereunder. In such position, the projections 34 are adapted to interengage with the teeth 47 of the bevel gear 46 of the reel mechanism. By adjusting the nut 61, the tension of spring 58 may be increased or decreased for adjusting the pressure desired to be imposed upon the friction plate 51 and the coacting friction surface 48 of gear 46 whereby friction accompanying relative rotation of these parts may be varied. Reel 66 is then mounted upon the hub flange 39 and rigidly secured thereto by the thumb screws 74 preferably so that the check-wire 25 will unwind from the reel drum from the outer side thereof. Check-wire 25 is then led through the check-head 24 and through the fork thereof, and the end of the check-wire staked to the ground at the end of the field prior to the first trip of the tractor planter down the field. As the tractor is moved down the field, it will be evident that as the check-wire is payed out, the planters will be operated under the control of the check-wire and the first three rows of the field planted concurrently with the paying out of the wire. Since the gear 46 remains stationary due to the engagement of the teeth 47 thereof with the projections 34 of the reel support 26, tension will be imposed upon the check-wire due to the frictional engagement of the friction member 51 with the friction face 48 of the gear 46. Since the friction between these two elements of the reel mechanism once an adjustment has been made is constant and uniform, the tension of the check-wire 25 will be uniform.

While the reel mechanism is illustrated in Figure 1 as being mounted on the left side of the planter frame, it will be evident that if the tractor is to be moved across the other end of the field in the same direction or in the opposite direction on the same side of the field, the reel mechanism may be mounted upon a similar mounting bracket provided at the right side of the tractor planter frame. For unreeling in this latter position, all that need be done is to reverse the reel 66 end for end upon the flange 39 of the reel hub 37. It will thus be apparent, that the check-wire may be unreeled and the first three rows of the field concurrently planted from either side of the tractor planter frame, the change from the position of the reel mechanism on one side of the planter frame to the other involving merely a shifting of the reel hub from one mount to the other and a reversal of the reel drum end for end upon the reel mechanism. The reversal of the drum may of course be readily and quickly accomplished by a mere loosening of the thumb screws 74 for removal of the reel drum from the hub flange 39, reversal of the drum end for end and reseating upon the flange 39 and by a subsequent tightening of the screws 74 against the inner periphery of the reel drum in its reversed position.

With the reel mechanism 35 disposed upon the supporting bracket 26 as shown in Figures 1 and 2, it will be noted that check-wire 25 is adapted to be payed out from the reel drum substantially tangentially thereof, the check-wire passing through the check-head 24 along a line substantially parallel to the adjacent side member of the frame of the planter whereby the check-wire is payed out across the field in substantial alignment with the line of travel of the planter. During such paying out of the check-wire, the friction slippage clutch parts of the reel mechanism 35 maintains a substantially constant tension upon the check-wire, such parts further guarding against any tendency on the part of the wire in passing through the check-head and tripping of the check-fork thereof to impart a spinning effect upon the reel drum. Thus, accurate checking operation is provided for in the initial paying out of the check-wire and concurrent planting operation.

When the tractor planter combination reaches the end of the first traverse of the field, the check-wire 25 is suitably doffed by the check-head 24 as is more specifically described in my copending application Serial No. 217,569 hereinbefore noted, and the reel mechanism 35 removed from the support and the wire suitably staked.

Upon completion of the planting of the field, it is of course desirable to again reel the check wire. To accomplish this, the reel mechanism 35 is mounted upon a suitable support 75 (see Figure 1), such support being disposed adjacent a suitable power take-off means 76 provided with suitable elements which are adapted to cooperate with the reel mechanism 35 to impart rotation thereto, the check-wire in the present position of the reel mechanism being guided through a guide member 77 suitably carried at the front end of the tractor upon a bracket 78 so disposed as to guide the check-wire clear of the front steering wheel of the tractor. The structure and operation of this portion of the improved mechanism is clearly described in my copending application Serial No. 415,221 and reference may be had thereto for a more detailed disclosure and description of this feature of the improved mechanism.

While I have disclosed a preferred embodiment of my invention, it will be understood that I do not wish to be limited thereto. As will be understood by those skilled in the art certain changes may be made therein without departing from the essence of the invention or the spirit and scope of the appended claims.

What I claim and desire to secure by Letters Patent is:

1. In combination, a planter comprising a frame having side members and planting units therebetween, a check-head carried by one of said side members and controlling operation of the units, a vertical spindle mounted on said frame, and a reel mechanism including friction clutch members journaled on said spindle and a reel drum secured to one of said clutch members, said spindle, being so disposed as to permit paying out of check-wire from the reel drum through the check-head tangentially of the reel drum in substantial alignment with the check-head, said friction clutch members coacting to retard rotation of said reel drum.

2. In combination, a planter comprising a frame having side members and planting units therebetween, a check-head carried by one of said side members and controlling operation of the units, a reel mechanism including friction clutch members and a reel drum secured to one of said clutch members, means for supporting said reel mechanism on the frame in advance of said check-head whereby check-wire may be payed out from said reel drum through said check-head in substantially parallel relation to the adjacent side frame member, and means preventing rotation of the other of said clutch members whereby rotation of said reel drum is retarded by said clutch members.

3. In combination, a planter comprising a frame having side members and planting units therebetween, a check-head carried by each of said side members and controlling operation of the units, a reel drum, and means for supporting the reel drum optionally at either side of the planter on said frame whereby check-wire may be payed out through either check-head, as desired, and so disposed as to effect paying out of the wire through either check-head in substantial alignment with either check-head, said reel drum supporting means including reel mechanism comprising a friction clutch member secured to said reel to rotate therewith and a second non-rotatable friction clutch member coacting with said first clutch member to retard rotation of said reel drum.

4. The combination with a planter having a check-head, of reel mechanism adapted to dispense check-wire for controlling said head, said reel mechanism including spring pressed members fixed together for relative rotation and adapted to yieldingly cooperate, and means for supporting said reel mechanism on said planter in advance of said check-head for paying out check-wire rearwardly through the check-head in substantial alignment with the check-head, said supporting means including means adapted to cooperate with one of said members to restrain rotation thereof whereby retarding effect to rotation is imposed upon the other member so that a predetermined tension is imposed upon the check-wire as it is payed out through the check-head.

5. The combination with a planter having a check-head, of a reel mechanism comprising a hub, a clutch disc interlocked with said hub, a bearing member within said hub, a second clutch disc rigidly associated with said bearing member, means adapted to yieldingly maintain said discs in frictional engagement, said second disc having a plurality of projections thereon, a reel drum rigidly associated with said hub, means for supporting the reel mechanism on the planter in a position for paying out check-wire from the reel drum through the check-head in substantial alignment with the check-head, and means on said supporting means cooperating with said projections to maintain said second disc stationary to impose a retarding effect to the rotation of the hub and associated drum during paying out of the check-wire whereby a substantially constant predetermined tension is imposed upon the check-wire.

6. The combination with a planter having a check-head, of a reel mechanism comprising a rotatable hub, a clutch member within said hub, the hub being rotatable relative to the bearing member, a second clutch member rigidly connected to said bearing member and having a plurality of laterally outwardly directed annular teeth, spring means in said hub normally urging said clutch members to frictional interengagement, a reel drum rigidly and removably associated with said hub, a supporting bracket on said planter having a spindle for receiving said bearing member to support the reel mechanism, the bracket being so disposed upon the planter for paying out check-wire from the reel drum through the check-head in alignment therewith, and a plurality of projections on said bracket adapted to have selective interengagement with said annular teeth to maintain said second clutch member stationary for imposing retarding effect to rotation of the first clutch member and through it to the reel drum during paying out of the check-wire whereby a substantially constant predetermined tension is imposed upon the check-wire.

7. The combination with a planter including a frame, of a reel mechanism support comprising a base member rigidly mounted on the frame, a spindle extending laterally from the base member, and a projection on said base member extending laterally therefrom in the direction of the spindle.

8. The combination with a planter including a frame, of a reel mechanism support comprising a base member rigidly mounted on the frame, a spindle extending laterally from the base member, and a projection on said base member extending laterally therefrom in the direction of the spindle, said projection being spaced from the spindle.

9. A support for a reel mechanism comprising a base member, a spindle member extending upwardly therefrom, said spindle comprising an upwardly tapering portion adjacent the base member and a cylindrical portion extending from the tapering portion, and a projection on said base member spaced from the spindle and extending laterally therefrom in the direction of the spindle.

10. A support for reel mechanism comprising a base member terminating at one end in an upwardly extending substantially cylindrical boss, a spindle extending upwardly from said boss and tapering upwardly, the base of the spindle being of lesser diameter than said boss and providing an annular ledge, said spindle terminating in a substantially cylindrical portion, and a plurality of upwardly directed projections simulating gear teeth adjacent the other end of said base member, said projections being arranged in circumferential relation to said spindle with the axis of the spindle as a center.

11. The combination with a planter having a check-head, of a reel mechanism comprising a hub, a clutch disc interlocked with said hub, a bearing member within said hub, a second clutch disc rigidly associated with said bearing member, means adapted to yieldingly maintain said discs in frictional engagement, said second disc having a plurality of projections thereon, a reel drum rigidly associated with said hub, means extending through said bearing member for supporting the reel mechanism on the planter in a position for paying out check-wire from the reel drum through the check-head in substantial alinement with the check-head, and means on said supporting means cooperating with said projections to maintain said second disc stationary to impose a retarding effect upon the rotation of the hub and associated drum during paying out of the check wire whereby a substantially constant predetermined tension is imposed upon the check wire.

12. In combination, a planter comprising a frame having side members and planting units therebetween, supporting wheels for said frame, a check-head carried on the outside of one of said side members and controlling operation of the units, a reel mechanism including a reel drum, means for supporting said reel mechanism on said frame in vertical disposition in advance of said check-head whereby check-wire may be payed out from said reel drum through said check-head in substantially parallel relation to the adjacent side frame members, said means being anchored to the frame inside of said check-head, and clutch members secured respectively to said reel drum and said frame member coacting to retard rotation of said reel drum in the paying out of said check-wire.

13. A support for a reel mechanism comprising a base member, a spindle carried by said base member, said spindle comprising a tapering portion and a cylindrical portion extending from the tapering portion, and means comprising a lug carried by the base member adjacent the tapering portion of the spindle, said lug being spaced radially from and extending in the same general direction as the spindle.

14. A support for a reel mechanism comprising a base member, means providing a spindle extending outwardly therefrom, means providing an annular ledge adjacent the spindle, said spindle formed with a tapered portion adjacent the ledge and terminating outwardly in a substantially cylindrical portion, and means comprising at least one projection spaced radially outwardly from the axis of the spindle, said projection simulating a gear tooth, 15. A support for a reel mechanism comprising a base member, means providing a spindle extending outwardly therefrom, means providing an annular ledge adjacent the spindle, said spindle formed with a tapered portion adjacent the ledge and terminating outwardly in a substantially cylindrical portion, and means comprising projections simulating gear teeth carried by the base member and spaced radially outwardly from the axis of the spindle, said projections lying adjacent the plane of the ledge.

16. A support for a reel mechanism comprising a base member terminating at one end in a substantially cylindrical boss, a spindle extending from said boss and tapering outwardly therefrom, the base of the spindle being of lesser diameter than said boss, thereby providing an annular ledge, said spindle terminating in a substantially cylindrical portion, and a plurality of projections extending from said base member, said projections simulating gear teeth and arranged in circumferential relation with respect to said spindle with the axis of the spindle as a center.

17. In a planter, the combination of power transmission means and a support disposed adjacent thereto, a second support having a fixed member associated therewith, a reel mechanism comprising a reel supporting member, a reel hub, a reel connected to the reel hub and adapted to have checkrow wire wound thereon, and slippage clutch means between said reel supporting member and said reel hub, said reel mechanism being adapted to be carried upon either of said supports, said reel supporting member being adapted to engage said power transmission means when the reel mechanism is carried upon the first support and adapted to engage said fixed member of said second support when the reel mechanism is carried thereon, said reel supporting member transmitting power from said power transmission means to said reel hub through said slippage clutch means to rotate the reel to wind the check-row wire thereon when said reel mechanism is carried on the first support, and said reel supporting member being locked against rotation by said fixed member on said second support and thereby tending to prevent movement of said reel when the reel mechanism is carried on said second support, whereby tension is maintained on said checkrow wire as the reel is rotated by the withdrawal of wire from the reel, such rotation being permitted by the actuation of said slippage clutch.

CHARLES H. WHITE.